United States Patent
Boo et al.

(10) Patent No.: US 10,968,936 B2
(45) Date of Patent: Apr. 6, 2021

(54) PANEL WITH A FASTENING DEVICE

(71) Applicant: VÄLINGE INNOVATION AB, Viken (SE)

(72) Inventors: Christian Boo, Kågeröd (SE); Peter Derelöv, Helsinborg (SE); Agne Pålsson, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 15/567,507

(22) PCT Filed: Apr. 26, 2016

(86) PCT No.: PCT/SE2016/050368
§ 371 (c)(1),
(2) Date: Oct. 18, 2017

(87) PCT Pub. No.: WO2016/175701
PCT Pub. Date: Nov. 3, 2016

(65) Prior Publication Data
US 2018/0112695 A1    Apr. 26, 2018

(30) Foreign Application Priority Data
Apr. 30, 2015 (SE) .................................... 1550538-1

(51) Int. Cl.
F16B 12/26    (2006.01)
F16B 12/24    (2006.01)
(Continued)

(52) U.S. Cl.
CPC ............ F16B 12/26 (2013.01); A47B 88/423 (2017.01); A47B 88/43 (2017.01); A47B 96/201 (2013.01);
(Continued)

(58) Field of Classification Search
CPC ........ F16B 12/125; F16B 12/26; F16B 12/24; F16B 12/10; A47B 2230/0081;
(Continued)

(56) References Cited

U.S. PATENT DOCUMENTS 291,032 A    1/1884  Cleland
634,581 A    10/1899 Miller
(Continued)

FOREIGN PATENT DOCUMENTS

CH    365507 A  * 11/1962  .............. F16B 12/24
CH    685 276 A5   5/1995
(Continued)

OTHER PUBLICATIONS

U.S. Appl. No. 14/486,681, filed Sep. 15, 2014, Hans Brännström, Agne Pålsson and Peter Derelöv, (Cited herein as US Patent Application Publication No. 2015/0078807 A1 of Mar. 19, 2015).
(Continued)

Primary Examiner — Matthew R McMahon
(74) Attorney, Agent, or Firm — Buchanan Ingersoll & Rooney P.C.

(57) ABSTRACT

A set comprising a panel and a fastening device for securing a furniture component, such as a hinge, an interior fitting, a carrying device or a slider, to the panel. The fastening device includes an element with a first element surface comprising a protruding part which protrudes from the first element surface. The panel comprises an edge surface and a panel surface, which includes an insertion groove. The fastening device is configured to be assembled to the panel with the first element surface facing the panel surface. The edge surface includes an edge groove and a flexible tongue is arranged in the edge groove. The protruding part is configured to be inserted into the insertion groove and includes a recess and the flexible tongue is configured to cooperate
(Continued)

with the recess for a locking of the fastening device to the panel.

15 Claims, 6 Drawing Sheets

(51) Int. Cl.
*A47B 96/20* (2006.01)
*A47B 88/43* (2017.01)
*F16B 21/18* (2006.01)
*A47B 88/423* (2017.01)
*F16B 12/10* (2006.01)

(52) U.S. Cl.
CPC ............. *F16B 12/10* (2013.01); *F16B 12/24* (2013.01); *F16B 21/186* (2013.01); *A47B 2230/12* (2013.01); *Y10T 403/4602* (2015.01); *Y10T 403/7073* (2015.01)

(58) Field of Classification Search
CPC ............ A47B 2230/12; A47B 47/0075; A47B 96/201; A47B 88/423; A47B 88/43; Y10T 403/4602; Y10T 403/7073
See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A * | 5/1975 | Logie ............... E04B 1/6162 312/263 |
| 3,885,845 A | 5/1975 | Krieks |
| 3,981,118 A | 9/1976 | Johnson et al. |
| 4,089,614 A | 5/1978 | Harley |
| 4,099,293 A * | 7/1978 | Pittasch ............... E05D 5/08 16/245 |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A * | 11/1981 | Bertschi ............... E04B 1/6162 403/296 |
| 4,308,961 A | 1/1982 | Kunce |
| 4,324,517 A | 4/1982 | Dey |
| 4,403,886 A | 9/1983 | Haeusler |
| 4,405,253 A * | 9/1983 | Stockum ............ F16B 12/2027 108/158 |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A * | 9/1995 | Chuan ............... F16B 12/14 312/257.1 |
| 5,458,433 A | 10/1995 | Stastny |
| 5,471,804 A * | 12/1995 | Winter, IV ............... E04B 1/14 403/231 |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,536,108 A | 7/1996 | Kvalheim |
| 5,658,086 A | 8/1997 | Brokaw et al. |
| 5,711,115 A | 1/1998 | Wirt |
| 5,775,521 A | 7/1998 | Tisbo |
| 5,810,505 A * | 9/1998 | Henriott ............... F16B 12/14 108/153.1 |
| 5,893,617 A | 4/1999 | Lee |
| 5,941,026 A | 8/1999 | Eisenreich |
| 5,944,294 A | 8/1999 | Baer |
| 5,950,380 A | 9/1999 | Porter |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 * | 5/2007 | Migli ............... F16B 12/2009 29/452 |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |

(56) References Cited

U.S. PATENT DOCUMENTS

| | | | |
|---|---|---|---|
| 7,621,092 B2 | 11/2009 | Groeke et al. | |
| 7,641,414 B1 | 1/2010 | Joyce | |
| 7,717,278 B2 | 5/2010 | Kao | |
| 7,721,503 B2 | 5/2010 | Pervan et al. | |
| 7,793,450 B2 | 9/2010 | Chasmer et al. | |
| 7,818,939 B2 | 10/2010 | Bearinger | |
| 7,998,549 B2 | 8/2011 | Susnjara | |
| 8,033,074 B2 * | 10/2011 | Pervan | E04F 15/02 52/582.1 |
| 8,038,363 B2 | 10/2011 | Hannig | |
| 8,042,311 B2 | 10/2011 | Pervan | |
| 8,146,754 B2 | 4/2012 | Apgood | |
| 8,220,217 B2 | 7/2012 | Muehlebach | |
| 8,234,830 B2 * | 8/2012 | Pervan | E04F 13/0894 52/582.1 |
| 8,365,499 B2 | 2/2013 | Nilsson et al. | |
| 8,387,327 B2 | 3/2013 | Pervan | |
| 8,464,408 B2 * | 6/2013 | Hazzard | F16B 12/24 24/706.5 |
| 8,495,849 B2 | 7/2013 | Pervan | |
| 8,505,257 B2 | 8/2013 | Boo et al. | |
| 8,544,230 B2 | 10/2013 | Pervan | |
| 8,596,013 B2 * | 12/2013 | Boo | E04F 15/02038 52/588.1 |
| 8,602,227 B1 | 12/2013 | McDonald | |
| 8,615,952 B2 | 12/2013 | Engström | |
| 8,713,886 B2 * | 5/2014 | Pervan | E04F 15/02 52/582.2 |
| 8,745,952 B2 | 6/2014 | Perra | |
| 8,764,137 B2 | 7/2014 | Fehre | |
| 8,776,473 B2 * | 7/2014 | Pervan | E04F 13/0894 52/586.1 |
| 8,833,028 B2 | 9/2014 | Whispell et al. | |
| 8,864,407 B1 | 10/2014 | Sorum | |
| 8,882,416 B2 | 11/2014 | Baur et al. | |
| 8,887,468 B2 | 11/2014 | Håkansson et al. | |
| 9,175,703 B2 | 11/2015 | Maertens et al. | |
| 9,216,541 B2 | 12/2015 | Boo | |
| 9,290,948 B2 | 3/2016 | Cappelle et al. | |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,700,157 B2 | 7/2017 | Keyvanloo | |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,745,756 B2 | 8/2017 | Hannig | |
| 9,758,973 B2 | 9/2017 | Segaert | |
| 9,763,528 B2 | 9/2017 | Lung | |
| 9,809,983 B2 | 11/2017 | Trudel | |
| 9,945,121 B2 | 4/2018 | Derelöv | |
| 10,034,541 B2 | 7/2018 | Boo et al. | |
| 10,202,996 B2 | 2/2019 | Håkansson et al. | |
| 10,378,570 B2 | 8/2019 | Broughton | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelöv et al. | |
| 10,669,716 B2 | 6/2020 | Derelöv | |
| 10,670,064 B2 | 6/2020 | Derelöv | |
| 10,724,564 B2 | 7/2020 | Derelöv | |
| 10,731,688 B2 | 8/2020 | Brännström et al. | |
| 10,736,416 B2 | 8/2020 | Derelöv et al. | |
| 10,871,179 B2 | 12/2020 | HåKansson et al. | |
| 10,876,562 B2 | 12/2020 | Pervan | |
| 10,876,563 B2 | 12/2020 | Derelöv et al. | |
| 2002/0170258 A1 | 11/2002 | Schwitte et al. | |
| 2004/0165946 A1 | 8/2004 | Areh et al. | |
| 2005/0042027 A1 | 2/2005 | Migli | |
| 2005/0236544 A1 | 10/2005 | Mancino | |
| 2005/0247653 A1 | 11/2005 | Brooks | |
| 2006/0091093 A1 | 5/2006 | Armari | |
| 2006/0101769 A1 | 5/2006 | Pervan et al. | |
| 2006/0180561 A1 | 8/2006 | Wisnoski et al. | |
| 2006/0236642 A1 | 10/2006 | Pervan | |
| 2006/0273085 A1 | 12/2006 | Casto | |
| 2007/0006543 A1 | 1/2007 | Engström | |
| 2007/0028547 A1 | 2/2007 | Grafenauer et al. | |
| 2008/0010937 A1 | 1/2008 | Pervan et al. | |
| 2008/0066415 A1 | 3/2008 | Pervan | |
| 2008/0193209 A1 | 8/2008 | Henderson | |
| 2008/0216435 A1 | 9/2008 | Nolan | |
| 2008/0236088 A1 | 10/2008 | Hannig et al. | |
| 2008/0244882 A1 | 10/2008 | Woxman et al. | |
| 2009/0014401 A1 | 1/2009 | Tallman | |
| 2009/0064624 A1 | 3/2009 | Sokol | |
| 2010/0028592 A1 | 2/2010 | Barkdoll et al. | |
| 2010/0083603 A1 | 4/2010 | Goodwin | |
| 2010/0104354 A1 | 4/2010 | Spalding | |
| 2010/0173122 A1 | 7/2010 | Susnjara | |
| 2010/0289389 A1 | 11/2010 | Crabtree, II | |
| 2011/0023303 A1 | 2/2011 | Pervan et al. | |
| 2011/0225921 A1 | 9/2011 | Schulte | |
| 2011/0225922 A1 | 9/2011 | Pervan et al. | |
| 2011/0280655 A1 | 11/2011 | Maertens et al. | |
| 2011/0283650 A1 | 11/2011 | Pervan et al. | |
| 2012/0009383 A1 | 1/2012 | Hardesty | |
| 2012/0027967 A1 | 2/2012 | Maertens et al. | |
| 2012/0073235 A1 | 3/2012 | Hannig | |
| 2012/0124932 A1 | 5/2012 | Schulte et al. | |
| 2012/0145845 A1 | 6/2012 | Hightower | |
| 2012/0180416 A1 | 7/2012 | Perra et al. | |
| 2012/0279161 A1 | 11/2012 | Håkansson et al. | |
| 2012/0286637 A1 | 11/2012 | Fehre | |
| 2013/0014463 A1 | 1/2013 | Pervan | |
| 2013/0048632 A1 | 2/2013 | Chen | |
| 2013/0071172 A1 | 3/2013 | Maertens et al. | |
| 2013/0081349 A1 | 4/2013 | Pervan | |
| 2013/0097846 A1 | 4/2013 | Pettigrew | |
| 2013/0111845 A1 | 5/2013 | Pervan | |
| 2013/0170904 A1 | 7/2013 | Cappelle et al. | |
| 2013/0232905 A2 | 9/2013 | Pervan | |
| 2013/0287484 A1 | 10/2013 | Phillips | |
| 2014/0013919 A1 | 1/2014 | Gerke et al. | |
| 2014/0055018 A1 | 2/2014 | Shein et al. | |
| 2014/0111076 A1 | 4/2014 | Devos | |
| 2014/0286701 A1 | 9/2014 | Sauer | |
| 2014/0294498 A1 | 10/2014 | Logan | |
| 2015/0034522 A1 | 2/2015 | Itou et al. | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2015/0230600 A1 | 8/2015 | Schulte | |
| 2015/0330088 A1 | 11/2015 | Derelöv | |
| 2015/0368896 A1 | 12/2015 | Schulte | |
| 2016/0000220 A1 | 1/2016 | Devos | |
| 2016/0007751 A1 | 1/2016 | Derelöv | |
| 2016/0145029 A1 | 5/2016 | Ranade et al. | |
| 2016/0174704 A1 | 6/2016 | Boo et al. | |
| 2016/0186925 A1 | 6/2016 | Bettin | |
| 2016/0192775 A1 | 7/2016 | Andersson | |
| 2016/0270631 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |
| 2017/0360193 A1 | 12/2017 | Boo et al. | |
| 2018/0080488 A1 | 3/2018 | Derelöv | |
| 2018/0087552 A1 | 3/2018 | Derelöv et al. | |
| 2018/0119717 A1 | 5/2018 | Derelöv | |
| 2018/0202160 A1 | 7/2018 | Derelöv | |
| 2018/0283430 A1 | 10/2018 | Leistert | |

(56) References Cited

U.S. PATENT DOCUMENTS

| | | |
|---|---|---|
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |

FOREIGN PATENT DOCUMENTS

| | | |
|---|---|---|
| CH | 696 889 A5 | 1/2008 |
| CH | 698 988 B1 | 12/2009 |
| CH | 705 082 A2 | 12/2012 |
| CN | 101099618 A | 1/2008 |
| CN | 102 917 616 A | 2/2013 |
| CN | 203424576 U | 2/2014 |
| DE | 1107910 B1 | 5/1961 |
| DE | 24 14 104 A1 | 10/1975 |
| DE | 25 14 357 A1 | 10/1975 |
| DE | 26 35 237 A | 2/1978 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2008 011 580 U1 | 11/2008 |
| DE | 20 2009 008 825 U1 | 10/2009 |
| DE | 102008035293 A1 * | 2/2010 ......... A47B 47/0075 |
| DE | 10 2009 041 142 A1 | 3/2011 |
| DE | 10 2011 057 018 A1 | 6/2013 |
| DE | 10 2013 008 595 A1 | 11/2013 |
| DE | 10 2015 103 429 A1 | 10/2015 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 0 935 076 A1 | 8/1999 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 650 375 A8 | 9/2006 |
| EP | 1 863 984 A1 | 5/2008 |
| EP | 1 922 954 A1 | 5/2008 |
| EP | 2 017 403 A2 | 1/2009 |
| EP | 2 037 128 A1 | 3/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 062 731 A5 | 6/1971 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U1 | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/02669 A1 | 1/2001 |
| WO | WO 01/02670 A1 | 1/2001 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/016654 A1 | 2/2003 |
| WO | WO 03/027510 A2 | 4/2003 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/103500 A1 | 10/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/150234 A1 | 12/2008 |
| WO | WO 2009/136195 A1 | 11/2009 |
| WO | WO 2010/023042 A1 | 3/2010 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2010/082171 A2 | 7/2010 |
| WO | WO 2010/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/072080 A1 | 5/2014 |
| WO | WO 2014/108114 A1 | 7/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/099396 A1 | 6/2016 |
| WO | WO 2016/175701 A1 | 11/2016 |
| WO | WO 2016/187533 A1 | 11/2016 |
| WO | WO 2017/131574 A1 | 8/2017 |
| WO | WO 2017/135874 | 8/2017 |
| WO | WO 2017/138874 A1 | 8/2017 |

OTHER PUBLICATIONS

(56) References Cited

OTHER PUBLICATIONS

U.S. Appl. No. 14/573,572, filed Dec. 17, 2014, Christian Boo, (Cited herein as US Patent Application Publication No. 2015/0198191 A1 of Jul. 16, 2015).
U.S. Appl. No. 15/271,622, filed Sep. 21, 2016, Peter Derelöv and Mats Nilsson, (Cited herein as US Patent Application Publication No. 2017/0079433 A1 of Mar. 23, 2017).
U.S. Appl. No. 15/308,872, filed Nov. 4, 2016, Darko Pervan, (Cited herein as US Patent Application Publication No. 2017/0089379 A1 of Mar. 30, 2017).
U.S. Appl. No. 15/379,791, filed Dec. 15, 2016, Niclas Håkansson and Darko Pervan, (Cited herein as US Patent Application Publication No. 2017/0097033 A1 of Apr. 6, 2017).
U.S. Appl. No. 15/415,356, filed Jan. 25, 2017, Peter Derelöv and Christian Boo, (Cited herein as US Patent Application Publication No. 2017/0208938 A1 of Jul. 27, 2017).
U.S. Appl. No. 15/422,798, filed Feb. 2, 2017, Magnus Fridlund, (Cited herein as US Patent Application Publication No. 2017/0227035 A1 of Aug. 10, 2017).
U.S. Appl. No. 15/428,469, filed Feb. 9, 2017, Magnus Fridlund, (Cited herein as US Patent Application Publication No. 2017/0227032 A1 of Aug. 10, 2017).
U.S. Appl. No. 15/428,504, filed Feb. 9, 2017, Christian Boo, (Cited herein as US Patent Application publication No. 2017/0227031 A1 of Aug. 10, 2017).
U.S. Appl. No. 15/432,190, filed Feb. 14, 2017, Magnus Fridlund, (Cited herein as US Patent Application Publication No. 2017/0234346 A1 of Aug. 17, 2017).
U.S. Appl. No. 15/642,757, filed Jul. 6, 2017, Peter Derelöv, (Cited herein as US Patent Application Publication No. 2017/0298973 A1 of Oct. 19, 2017).
U.S. Appl. No. 15/646,714, filed Jul. 11, 2017, Peter Derelöv, (Cited herein as US Patent Application Publication No. 2018/0087552 A1 of Mar. 29, 2018).
U.S. Appl. No. 15/562,254, filed Sep. 27, 2017, Peter Derelöv, (Cited herein as US Patent Application Publication No. 2018/0080488 A1 of Mar. 22, 2018).
U.S. Appl. No. 15/794,491, filed Oct. 26, 2017, Peter Derelöv, (Cited herein as US Patent Application Publication No. 2018/0119717 A1 of May 3, 2018).
U.S. Appl. No. 15/923,701, filed Mar. 16, 2018, Peter Derelöv.
U.S. Appl. No. 15/956,949, filed Apr. 19, 2018, Peter Derelöv.
U.S. Appl. No. 15/978,630, filed May 14, 2018, Jonas Fransson, Niclas Håkansson and Agne Pålsson.
U.S. Appl. No. 16/027,479, filed Jul. 5, 2018, Christian Boo and Peter Derelöv.
U.S. Appl. No. 15/923,701, Derelöv.
U.S. Appl. No. 15/956,949, Derelöv.
U.S. Appl. No. 15/978,630, Fransson, et al.
U.S. Appl. No. 16/027,479, Boo, et al.
International Search Report/Written Opinion dated Jun. 21, 2016 in PCT/SE2016/050368, ISA/SE, Patent-och registreringsverket, Stockholm, SE, 10 pages.
Derelöv, Peter, U.S. Appl. No. 15/923,701 entitled "Panels Comprising a Mechanical Locking Device and an Assembled Product Comprising the Panels", filed Mar. 16, 2018.
Derelöv, Peter, U.S. Appl. No. 15/956,949 entitled "Panels for an Assembled Product", filed Apr. 19, 2018.
Fransson, Jonas, et al., U.S. Appl. No. 15/978,630 entitled "Elements and a Locking Device for an Assembled Product," filed May 14, 2018.
Boo, Christian, et al., U.S. Appl. No. 16/027,479 entitled "Panels Comprising a Mechanical Locking Device and an Assembled Product Comprising the Panels," filed Jul. 5, 2018.
Extended European Search Report issued in EP Application No. 16786854.6, dated Sep. 24, 2018, European Patent Office, Munich, DE, 7 pages.
U.S. Appl. No. 16/220,574, filed Dec. 14, 2018, Peter Derelöv.
U.S. Appl. No. 16/220,585, filed Dec. 14, 2018, Peter Derelöv.
U.S. Appl. No. 16/228,975, filed Dec. 21, 2018, Niclas Håkansson and Darko Pervan.
U.S. Appl. No. 16/361,609, filed Mar. 22, 2019, Peter Derelöv, Johan Svensson and Lars Gunnarsson.
U.S. Appl. No. 16/386,732, filed Apr. 17, 2019, Christian Boo.
U.S. Appl. No. 16/386,810, filed Apr. 17, 2019, Christian Boo.
U.S. Appl. No. 16/386,824, filed Apr. 17, 2019, Christian Boo.
U.S. Appl. No. 16/386,874, filed Apr. 17, 2019, Peter Derelöv.
U.S. Appl. No. 16/220,574, Derelöv.
U.S. Appl. No. 16/220,585, Derelöv.
U.S. Appl. No. 16/228,975, Håkansson et al.
U.S. Appl. No. 16/361,609, Derelöv et al.
U.S. Appl. No. 16/386,732, Boo.
U.S. Appl. No. 16/386,810, Boo.
U.S. Appl. No. 16/386,824, Boo.
U.S. Appl. No. 16/386,874, Derelöv.
Derelöv, Peter, U.S. Appl. No. 16/220,574 entitled "Set of Panels," filed Dec. 14, 2018.
Derelöv, Peter, U.S. Appl. No. 16/220,585 entitled "Set of Panels," filed Dec. 14, 2018.
Håkansson, Niclas, et al., U.S. Appl. No. 16/228,975 entitled "Mechanical Locking System for Building Panels," filed Dec. 21, 2018.
Derelöv, Peter, et al., U.S. Appl. No. 16/361,609 entitled "Panels Comprising a Mechanical Locking Device and an Assembled Product Comprising the Panels," filed Mar. 22, 2019.
Boo, Christian, U.S. Appl. No. 16/386,732 entitled "Set of Panels With a Mechanical Locking Device," filed Apr. 17, 2019.
Boo, Christian, U.S. Appl. No. 16/386,810 entitled "Set of Panels With a Mechanical Locking Device," filed Apr. 17, 2019.
Boo, Christian, U.S. Appl. No. 16/386,824 entitled "Set of Panels With a Mechanical Locking Device," filed Apr. 17, 2019.
Derelöv, Peter, U.S. Appl. No. 16/386,874 entitled "Symmetric Tongue and T-Cross," filed Apr.17, 2019.
U.S. Appl. No. 16/553,325, filed Aug. 28, 2019, Peter Derelöv and Johan Svensson.
U.S. Appl. No. 16/553,350, filed Aug. 28, 2019, Peter Derelöv and Johan Svensson.
U.S. Appl. No. 16/564,438, filed Sep. 9, 2019, Häns Brannström, Agne Pålsson and Peter Derelöv.
U.S. Appl. No. 16/567,436, filed Sep. 11, 2019, Peter Derelöv and Mats Nilsson.
U.S. Appl. No. 16/663,603, filed Oct. 25, 2019, Magnus Fridlund.
U.S. Appl. No. 16/697,335, filed Nov. 27, 2019, Christian Boo and Peter Derelöv.
U.S. Appl. No. 16/553,325, Derelöv et al.
U.S. Appl. No. 16/553,350, Derelöv et al.
U.S. Appl. No. 16/564,438, Brännström et al.
U.S. Appl. No. 16/567,436, Derelöv.
U.S. Appl. No. 16/663,603, Fridlund.
U.S. Appl. No. 16/697,335, Boo et al.
Derelöv, Peter, U.S. Appl. No. 16/553,325 entitled "Set of Panels with a Mechanical Locking Device," filed Aug. 28, 2019.
Derelöv, Peter, U.S. Appl. No. 16/553,350 entitled "Set of Panels with a Mechanical Locking Device," filed Aug. 28, 2019.
Brännström, Hans, et al., U.S. Appl. No. 16/564,438 entitled "Assembled Product and a Method of Assembling the Assembled Product," filed Sep. 9, 2019.
Derelöv, Peter, U.S. Appl. No. 16/567,436 entitled "Panels Comprising a Mechanical Locking Device and an Assembled Product Comprising the Panels," filed Sep. 11, 2019.
Fridlund, Magnus, U.S. Appl. No. 16/663,603 entitled "Element and Method for Providing Dismantling Groove," filed Oct. 25, 2019.
Boo, Christian, et al., U.S. Appl. No. 16/697,335 entitled "Panels Comprising a Mechanical Locking Device and an Assembled Product Comprising the Panels," filed Nov. 27, 2019.
U.S. Appl. No. 16/703,077, Fridlund.
U.S. Appl. No. 16/722,096, Derelöv et al.
Fridlund, Magnus, U.S. Appl. No. 16/703,077 entitled "Set of Panels for an Assembled Product," filed Dec. 4, 2019.
Derelöv, Peter, et al., U.S. Appl. No. 16/722,096 entitled "Panels Comprising a Mechanical Locking Device and an Assembled Product Comprising the Panels," filed Dec. 20, 2019.

(56) References Cited

OTHER PUBLICATIONS

U.S. Appl. No. 16/861,639, filed Apr. 29, 2020, Peter Derelöv.
U.S. Appl. No. 16/681,639, Derelöv et al.
Derelöv, Peter, U.S. Appl. No. 16/861,639 entitled "Panels Comprising a Mechanical Locking Device and an Assembled Product Comprising the Panels," filed Apr. 29, 2020.
U.S. Appl. No. 16/946,047, filed Jun. 4, 2020, Darko Pervan.
U.S. Appl. No. 16/915,258, filed Jun. 29, 2020, Hans Brännström, Agne Pålsson and Peter Derelöv.
U.S. Appl. No. 16/946,047, Pervan.
U.S. Appl. No. 16/915,258, Brännström et al.
Pervan, Darko, U.S. Appl. No. 16/946,047 entitled "Mechanical Locking System for Building Panels," filed Jun. 4, 2020.
Brännström, Hans, et al., U.S. Appl. No. 16/915,258 entitled "Assembled Product and Method of Assembling the Assembled Product," filed Jun. 29, 2020.

* cited by examiner

PANEL WITH A FASTENING DEVICE

TECHNICAL FIELD OF THE INVENTION

The present invention relates to a fastening device for connecting a furniture component to a panel.

TECHNICAL BACKGROUND

Furniture components are known that are fixed to e.g. a furniture panel by screws. A drawback with the known systems is that it time consuming to assemble the furniture components to the furniture.

The above description of various known aspects is the applicant's characterization of such, and is not an admission that any of the above description is considered as prior art.

SUMMARY OF THE INVENTION

It is an object of certain embodiments of the present invention to provide an improvement over the above described techniques and known art. Particularly to reduce the time for assembling and to provide a to provide a tool-less assembling.

At least some of these and other objects and advantages that will be apparent from the description have been achieved by a first aspect of the invention that comprises a set comprising a panel and a fastening device for securing a furniture component, such as a hinge, an interior fitting, a carrying device or a slider, to the panel. The fastening device comprises an element with a first element surface comprising a protruding part which protrudes from the element surface. The panel comprises an edge surface and a panel surface. The edge surface is preferably essentially perpendicular to the panel surface. The panel surface comprises an insertion groove. The fastening device is being configured to be assembled to the panel with the first element surface facing the panel surface. The edge surface comprises an edge groove and a flexible tongue is arranged in the edge groove and the protruding part comprises a recess. The protruding part is configured to be inserted into the insertion groove and the flexible tongue is configured to cooperate with the recess for a locking of the fastening device to the panel.

An advantage of the invention may be that the fastening device may be locked to the panel without tools.

The insertion groove preferably extends from the panel surface to the edge groove. The insertion groove may be a bottom-ended groove, such as a bottom ended drill hole, comprising a bottom surface which is positioned at a distance from the edge groove.

The element may comprise two or more of said protruding part and the panel surface may comprise two or more of said insertion groove. The insertion grooves are preferably arranged linearly. Each of the protruding parts is configured to be inserted into one of the insertion grooves.

The edge groove may be a longitudinal groove that extends in a longitudinal direction of the edge surface and edge groove may be covered by e.g. an edging.

The edge groove preferably extends from the edge surface to the insertion groove. The edge groove is preferably a bottom-ended groove, comprising a bottom surface which is positioned at a distance from the edge groove. The flexible tongue may be arranged at the bottom surface of the edge groove.

The flexible tongue may be arranged between the recess and the bottom surface of the edge groove in a locked position of the fastening device and the panel.

The fastening device and the panel are preferably configured to be automatically locked together when the protruding part is inserted into the insertion groove and the element surface is arranged against panel surface.

The protruding past is preferably rotatable relative the element. The fastening device is preferably unlocked from the panel by a rotation of the protruding part relative the element. The rotation may force the flexible tongue out of the recess. The protruding part may extend from the first element surface, through the element, and to a second element surface. The protruding part may comprise a grip device, such as a recess or a wing, at the second element surface.

The second element surface may comprise a fastener for securing the furniture component.

The core of the panel may be a wood-based core, preferably made of MDF, HDF, OSB, WPC, plywood or particleboard. The core may also be a plastic core comprising thermosetting plastic or thermoplastic e.g. vinyl PVC, PU or PET. The plastic core may comprise filters. The panel may be provided with a decorative layer, such as a foil or a veneer, on one or more surfaces. The panel may also be of solid wood.

BRIEF DESCRIPTION OF THE DRAWINGS

The present invention will by way of example be described in more detail with reference to the appended schematic drawings, which shows embodiments of the present invention.

FIG. 6C shows an embodiment of the locking device adapted to the flexible tongue in FIG. 6A-C

DETAILED DESCRIPTION

Figure 1:
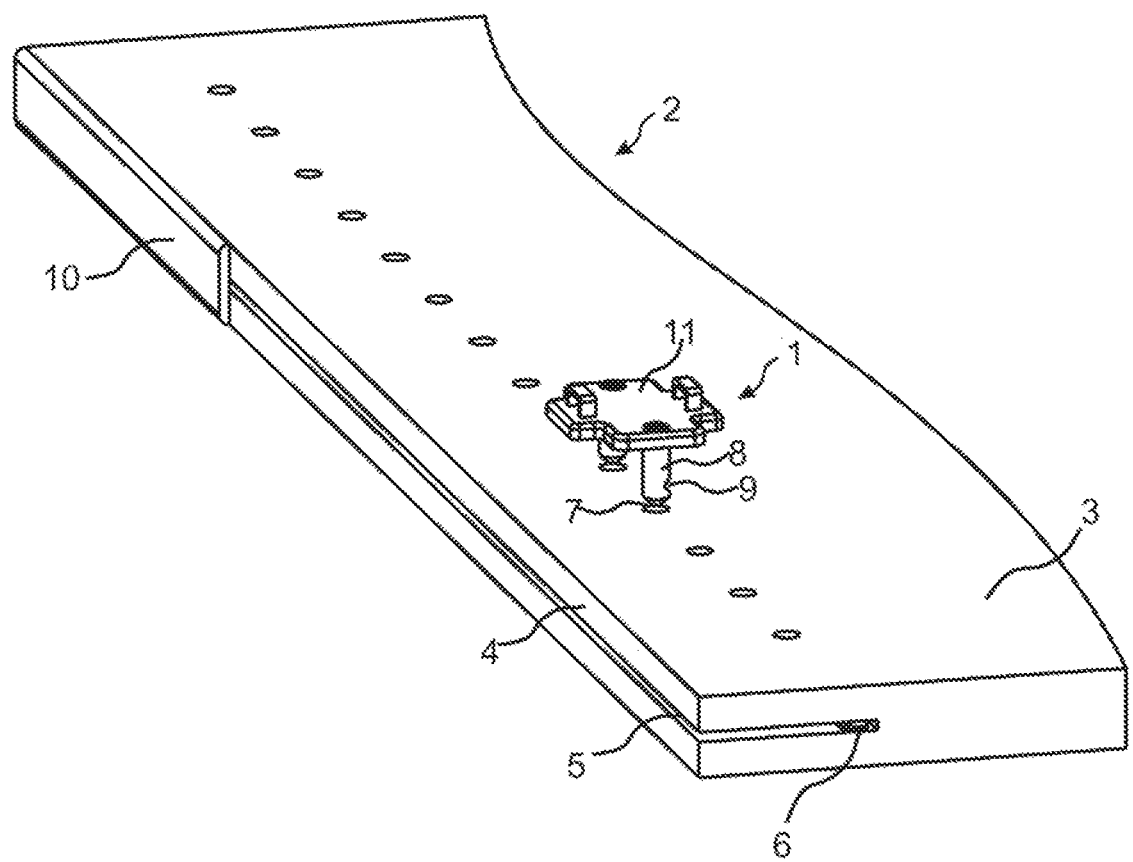
FIG. 1 shows a 3D-view of an embodiment of the invention during assembling.
Figure 2A:
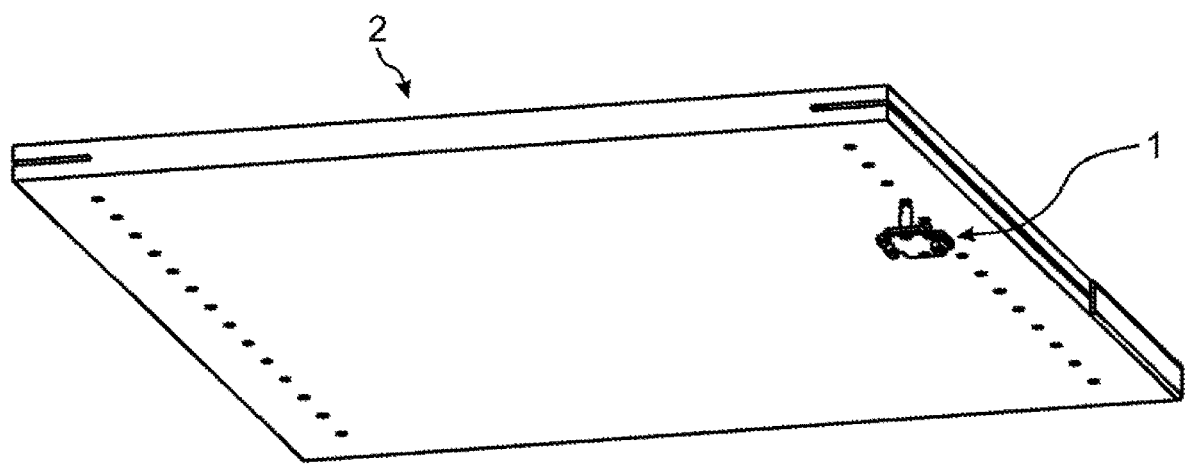
FIG. 2A shows a 3D-view of an embodiment of the invention during assembling.

An embodiment of the invention is shown in FIG. 1. The embodiment comprises a panel 2 and a fastening device 1 for securing a furniture component, such as a hinge, an interior fitting, a carrying device or a slider, to the panel 2. The fastening device 1 comprises an element 11 with a first element surface 12 comprising two protruding parts 8 which protrudes from the element surface 12, even though the element surface may comprise one or several protruding parts. The panel comprises an edge surface 4 and a panel surface 3, which is the main surface of the panel. FIG. 1 shows only a part of the panel in a 3D-view. The whole panel is shown in a 3D-view in FIG. 2A. The panel surface comprises a row of insertion grooves 7 adjacent the edge surface 4. The panel surface may comprise one or several insertion grooves. The fastening device 1 is configured to be assembled to the panel with the first element surface 12 facing the panel surface 3. The edge surface 4 comprises an edge groove 5 and a flexible tongue 6 is arranged in the edge groove 5. The edge groove 5 is a longitudinal groove that extends in a longitudinal direction of the edge surface 4. The edge groove may extend along essentially the whole edge surface 4. FIG. 2A shows that also an opposite edge surface may comprise an edge groove. The protruding part 8 is configured to be inserted into the insertion groove 7 and comprises a recess 9. The flexible tongue 6 is configured to cooperate with the recess 9 for a locking of the fastening device 1 to the panel 2. The edge groove is preferably covered by a covering element 10, such as an edge band or a veneer layer, after an insertion of the flexible tongue in the edge groove 5. The insertion grooves may be bottom ended drill holes with a diameter of about 3 mm to about 10 mm. The insertion grooves may be arranged in a line and at a centre-to-centre distance of about 20 mm to about 50 mm. The drill holes may have furniture standard diameter of 5 mm or 3.2 mm that may be arranged at a standard centre-to-centre distance of 32 mm. The protruding part may be of a cylindrical shape, such as a rod, with a diameter that essentially corresponds to the diameter of the drill hole. The protruding part may comprise a polymeric and/or metallic material. An embodiment that comprises protruding parts with a small diameter may comprise three or more protruding parts in order to increase the strength of the fastening device.

Figure 2B:
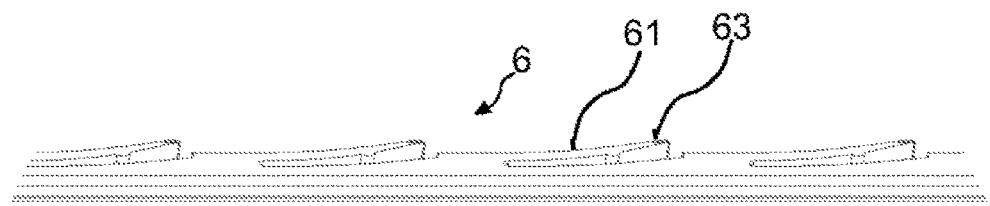
FIG. 2B shows an embodiment of a flexible tongue of an embodiment of the invention.
Figure 3A:
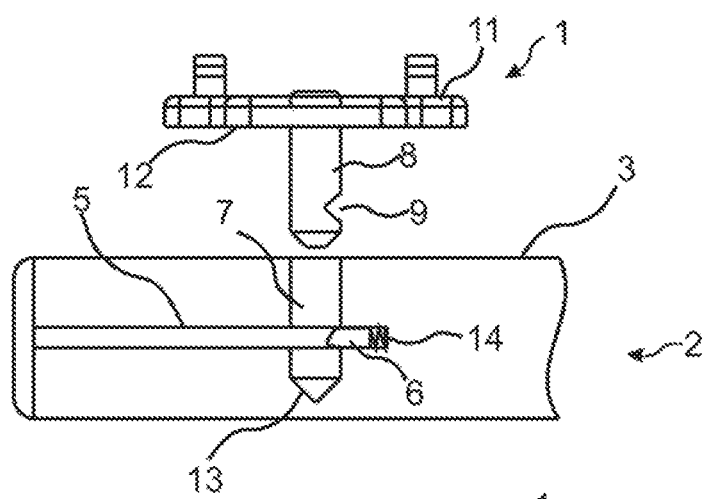
FIGS. 3A-D show an embodiment of an assembling of an embodiment of the invention.

An embodiment of the flexible tongue 6 is shown in FIG. 2B. The embodiment comprises a first essentially straight edge, which is configured to cooperate with the recess 9 on the protruding part 8, and a second edge that comprises flexible protruding parts 61. The protruding parts are preferably arranged against a bottom surface 14 of the edge groove 14, see FIG. 3A. The flexible tongue may comprise a friction connection 63, preferably at an outer tip of one or more of the flexible protruding parts 61.

FIGS. 3A-D show an embodiment of the fastening device 1 and a cross cut of an embodiment of the panel 2 during assembling of the fastening device 1 to the panel 2. The fastening device 1 is displaced in a direction which is essentially perpendicular to the panel surface 3. The insertion groove 7 extends from the panel surface 3 to the edge groove 5. The insertion groove 7 is a bottom-ended groove, such as a bottom ended drill hole, comprising a bottom surface 13 which is positioned at a distance from the edge groove 5. The edge groove 5 extends from the edge surface 4 to the insertion groove 7. The edge groove 7 is a bottom-ended groove, comprising a bottom surface 14 which is positioned at a distance from the insertion groove 7. The flexible tongue 6 is arranged at the bottom surface 14 of the edge groove 5. The fastening device and the panel are configured to be automatically locked together when the protruding part 8 is inserted into the insertion groove 7 and the first element surface 12 is arranged against panel surface 3.

Figure 3B:
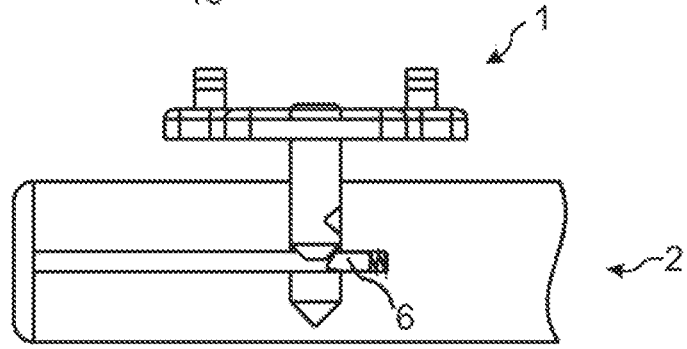

The protruding part 8 is in FIG. 3B partly displaced into the insertion groove 7 and a guiding surface at an outer edge of the protruding part 8 is cooperating with a guiding surface at an outer edge of the flexible tongue 6.

Figure 3C:
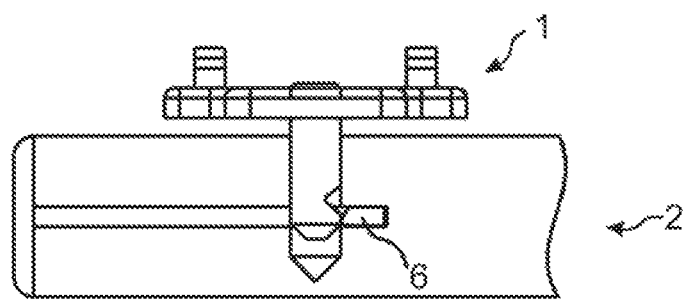
Figure 3D:
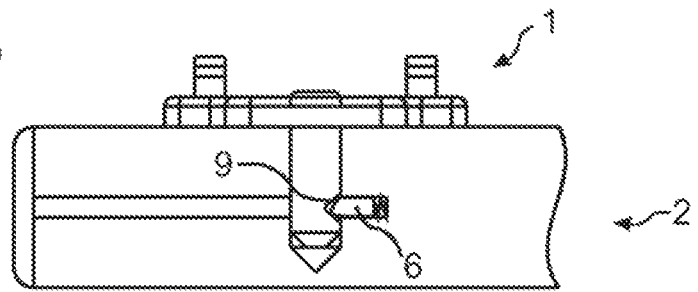

The protruding part 8 is in FIG. 3C displaced further into insertion groove 7 and the flexible tongue 6 is in FIG. 3C pushed against the bottom surface 14 of the edge groove 5 by the protruding part 8.

The flexible tongue 6 is configured to spring back and into the recess 9 of the protruding part 8 when the protruding part 8 is displaced to a locked position which is shown in FIG.

3D. The flexible tongue 6 is arranged between the recess 9 and the bottom surface 14 and a locking surface of the flexible tongue 6 cooperates with a locking surface of the recess 9 for the locking of the fastening device to the panel.

Figure 4A:
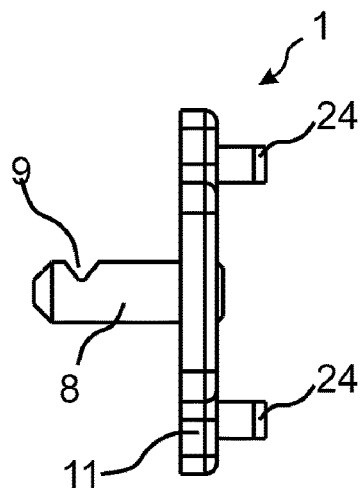
FIGS. 4A-D show in different views an embodiment of the invention.
Figure 4B:
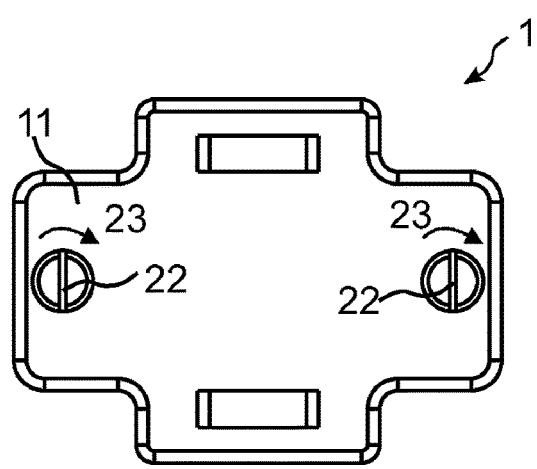
Figure 4C:
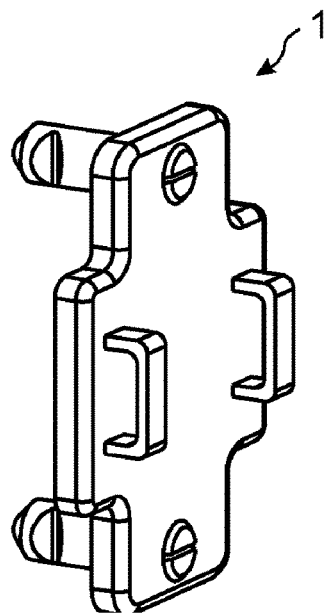
Figure 4D:
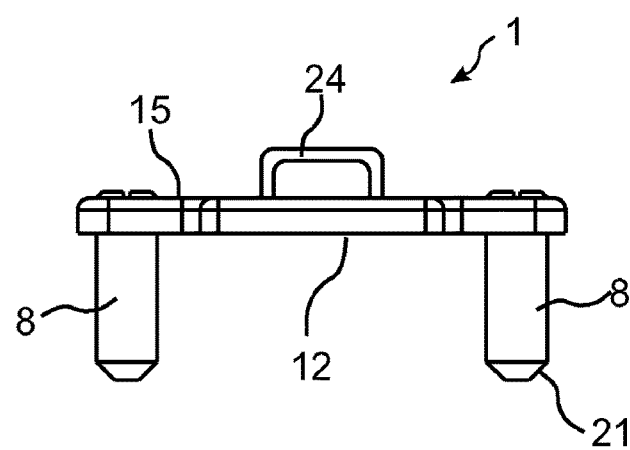

FIG. 4A-D show an embodiment of the fastening element in a first side view, a top view, a 3D-view and a second side view, respectively. The embodiment comprises two fasteners 24 at a second surface 15 of the element 11. The fasteners may be used for locking a furniture component, such as a hinge, to the fastening element. Other embodiments may, depending on the furniture component, lack a fastener or comprise one or several fasteners. The protruding part 8 is rotatable relative the element 1, as is shown in FIG. 4B. The fastening device 1 is preferably unlocked from the panel 2 by a rotation 23 of the protruding part 8 relative the element 11. The rotation 23 may force the flexible tongue 6 out of the recess 9. The protruding part may extend from the first element surface 12, through the element 11, and to a second element surface 15. The protruding part 8 may comprise a grip device 22, such as a recess or a wing (not shown), at the second element surface 15. The protruding part 8 may comprise an angled tip 21.

Figure 5A:
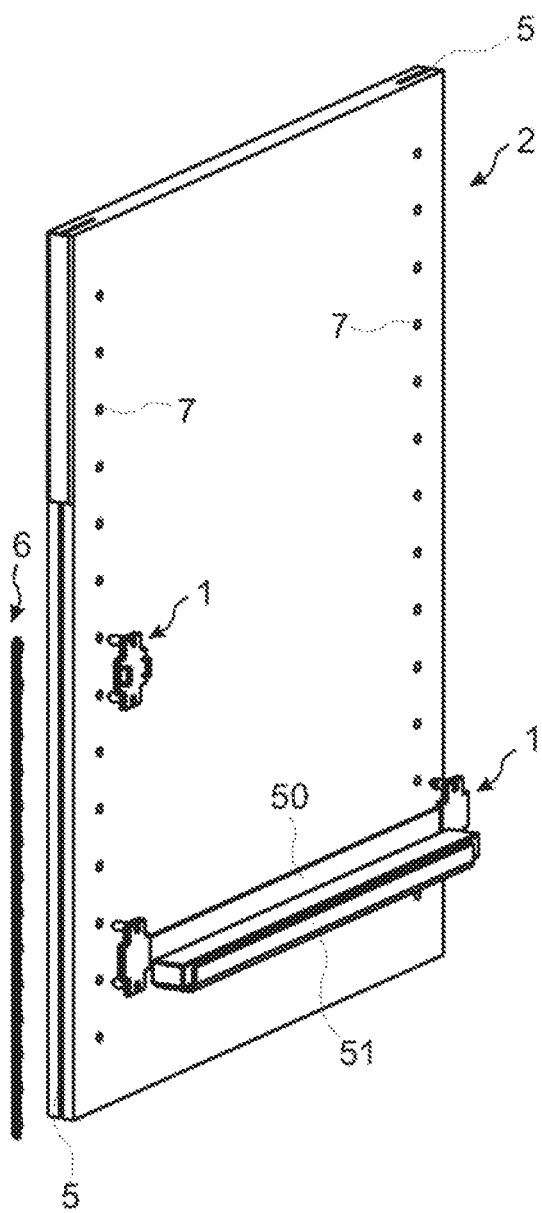
FIGS. 5A-B show an embodiment of the invention before and after assembling, respectively.
Figure 5B:
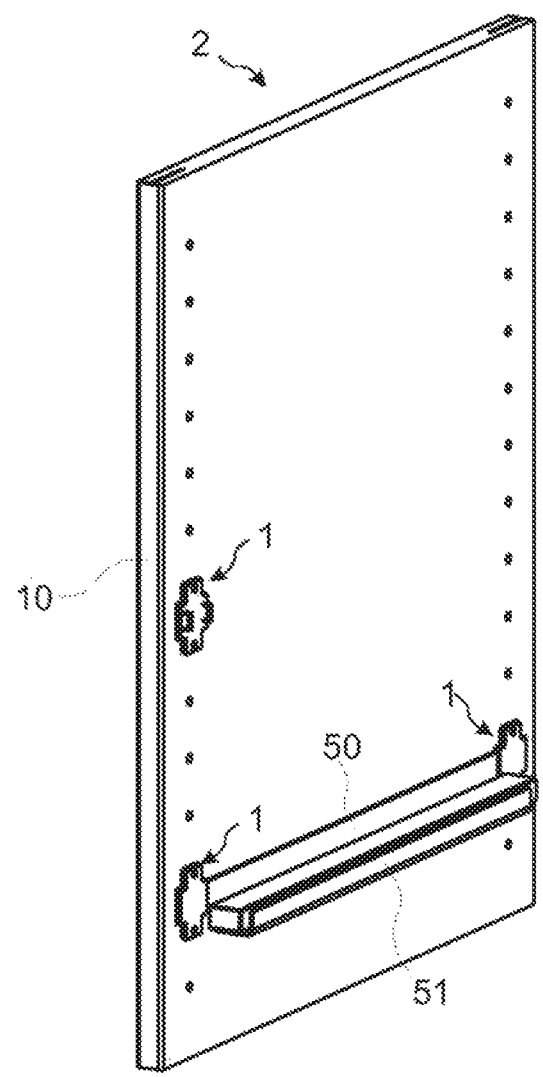

FIG. 5A-B show in 3D-views an embodiment comprising a first of said fastening device 1 attached to a first end of a connecting element 50 and a second of said fastening device 1 attached to a second end of the connecting element 50. A furniture component 51, such as a slider may be attached to the connecting element. FIG. 5A shows the embodiment before assembling and FIG. 5B shows the embodiment in an assembled configuration. A flexible tongue 6 is arranged in a first and a second of said edge groove 5, respectively, and a covering element 10 is attached to a first and a second of said edge surfaces as is shown in FIG. 5B. The first fastening device is configured to be locked to the panel at a first edge of the panel 2 and the second fastening device is configured to be locked to the panel at an opposite second edge of the panel 2. The panel comprises a first row of said insertion grooves 7 the first edge and a second row of said insertion grooves at the second edge. The embodiment may further comprise a third of said fastening device 1 at the first edge. A furniture component, such as a hinge, may be attached to the third fastening device.

Figure 6A:
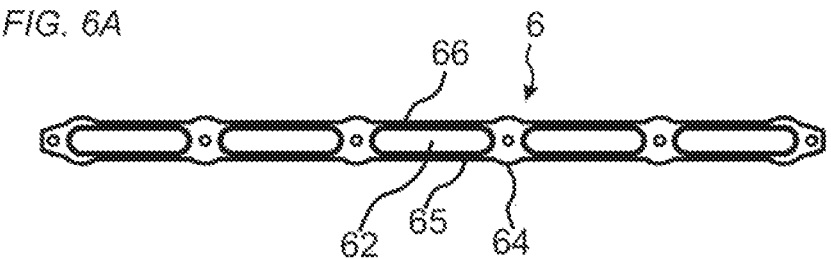
FIG. 6A-C show in different views an embodiment of a flexible tongue of an embodiment of the invention.
Figure 6B:
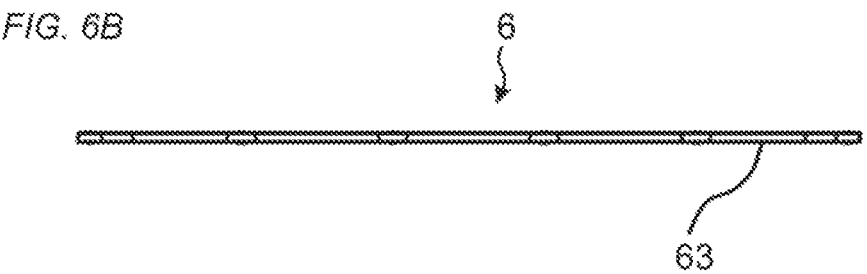
Figure 6C:
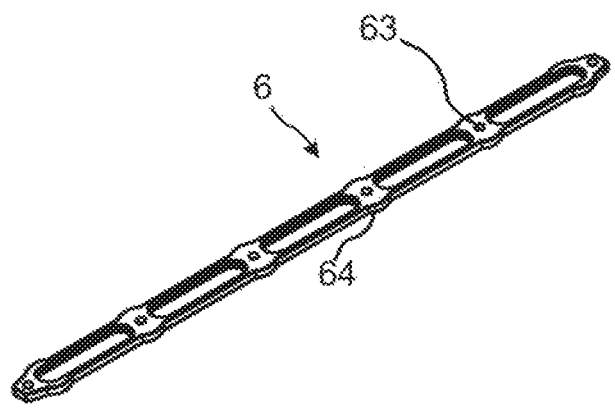
Figure 6D:
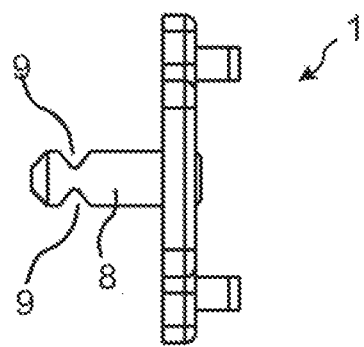

FIG. 6A-C show in a top view, a side view and a 3D-view, respectively, an embodiment of the flexible tongue 6. The flexible tongue comprises a recess 62 which comprises a first flexible wall 65 and a second flexible wall 66 at a first and a second edge, respectively, of the flexible tongue. The first and the second flexible wall are configured to be displaced by the protruding part 8 during assembling of the fastening device 1 to the panel 2. The flexible tongue 6 may comprise one or several of said recesses 62. The first and/or the second edge of the flexible tongue may comprise a protrusion 64 that may facilitate the displacement of the first flexible wall 65 or the second flexible wall 66 during the assembling. An outer surface of the protrusion 64 is configured to cooperate with the bottom surface 14 of the edge groove 5. The flexible tongue 6 may comprise one or several of said protrusion 64. The flexible tongue may further comprise one or more a friction connections 63. The flexible tongue 6 may cooperate with an embodiment of the fastening device, shown in FIG. 6D, that comprises a protruding part which comprises a first of said recess 9 at a first side and a second of said recess 9 at a second side. The first flexible wall is configured to cooperate with the recess at the first side and the second flexible wall is configured to cooperate with the recess at the second side for the locking of the fastening device 1 to the panel 2.

The invention claimed is:

1. A set comprising a panel and a fastening device for securing a furniture component to the panel,
   the fastening device comprising an element with a first element surface comprising a protruding part which protrudes from the first element surface,
   the panel comprising an edge surface and a panel surface,
   the edge surface extending between first and second edges, and between third and fourth edges, the first and second edges being longer than the third and fourth edges, and
   the panel surface being a main surface of the panel which is larger than the edge surface, the panel surface being wider than the fastening device as viewed along a direction orthogonal to the panel surface, the panel surface extending along the first edge and perpendicularly to the edge surface, the fastening device being configured to be assembled to the panel with the first element surface facing and contacting the panel surface in an assembled position of the fastening device to the panel surface, wherein
   the edge surface comprises an edge groove,
   the panel surface includes an insertion groove extending perpendicular to the edge groove,
   a flexible tongue is arranged in the edge groove such that the flexible tongue protrudes partially into the insertion groove,
   the protruding part comprises a recess,
   the protruding part is configured to be inserted into the insertion groove, and
   the flexible tongue is configured to cooperate with the recess for locking the fastening device to the panel.

2. The set as claimed in claim 1, wherein the insertion groove extends from the panel surface to the edge groove.

3. The set as claimed in claim 1, wherein the insertion groove is a bottom-ended groove comprising a bottom surface which is positioned at a distance from the edge groove.

4. The set as claimed in claim 1, wherein the element comprises two or more of said protruding parts and the panel surface comprises two or more of said insertion grooves, wherein each of the protruding parts is configured to be inserted into one of the insertion grooves.

5. The set as claimed in claim 1, wherein the edge groove is a longitudinal groove that extends in a longitudinal direction of the edge surface.

6. The set as claimed claim 1, wherein the edge groove extends from the edge surface to the insertion groove.

7. The set as claimed in claim 1, wherein the edge groove is a bottom-ended groove, comprising a bottom surface which is positioned at a distance from the insertion groove.

8. The set as claimed in claim 7, wherein the flexible tongue is arranged at the bottom surface of the edge groove.

9. The set as claimed in claim 7, wherein the flexible tongue is arranged between the recess and the bottom surface of the edge groove in a locked position of the fastening device and the panel.

10. The set as claimed in claim 1, wherein the fastening device and the panel are configured to be automatically locked together when the protruding part is inserted into the insertion groove and the first element surface is arranged against panel surface.

11. The set as claimed in claim 1, wherein the protruding part is rotatable relative to the element in order to unlock the fastening device from the panel.

12. The set as claimed in claim 1, wherein the protruding part extends from the first element surface, through the element, and to a second element surface.

13. The set as claimed in claim 1, wherein a second element surface comprises a fastener for securing the furniture component, the fastener being located directly opposite to a portion of the element which is free of any protruding part.

14. The set as claimed in claim 1, wherein the insertion groove is adjacent the edge surface.

15. The set as claimed in claim 1, wherein the flexible tongue is configured to be linearly displaced to cooperate with the recess for locking the fastening device to the panel.

* * * * *